United States Patent
Koike et al.

(10) Patent No.: US 9,180,903 B2
(45) Date of Patent: Nov. 10, 2015

(54) STEERING COMMUNICATION DEVICE, STEERED-OBJECT COMMUNICATION DEVICE AND STEERING COMMUNICATION SYSTEM

(71) Applicant: Futaba Corporation, Mobara-shi, Chiba (JP)

(72) Inventors: Yasutaka Koike, Mobara (JP); Masahiro Saegusa, Mobara (JP); Masahiro Tanaka, Mobara (JP)

(73) Assignee: Futaba Corporation, Mobara-Shi, Chiba (JP)

( * ) Notice: Subject to any disclaimer, the term of this patent is extended or adjusted under 35 U.S.C. 154(b) by 0 days.

(21) Appl. No.: 13/668,966

(22) Filed: Nov. 5, 2012

(65) Prior Publication Data

US 2013/0138266 A1 May 30, 2013

(30) Foreign Application Priority Data

Nov. 30, 2011 (JP) .................................. 2011-262400

(51) Int. Cl.
*B62D 1/28* (2006.01)
*H04W 4/04* (2009.01)
(Continued)

(52) U.S. Cl.
CPC *B62D 1/28* (2013.01); *H04L 69/22* (2013.01); *H04W 4/046* (2013.01); *H04W 56/00* (2013.01); *G07C 5/008* (2013.01)

(58) Field of Classification Search
CPC ....................................................... B62D 1/00
USPC .......... 701/2, 23, 24, 29.1, 30.5–31.1, 41, 44, 701/120–122; 700/3, 17, 20, 248; 370/229–235; 455/85; 340/310.11, 340/426.13, 426.14, 426.15, 426.16, 340/426.17, 426.24, 815.6, 870.01–870.15, 340/901, 945, 971–980; 341/176
See application file for complete search history.

(56) References Cited

U.S. PATENT DOCUMENTS 5,311,541 A * 5/1994 Sanderford, Jr. ............... 375/131
6,647,328 B2 * 11/2003 Walker ............................. 701/36
(Continued)

FOREIGN PATENT DOCUMENTS

JP 02-311100 12/1990

OTHER PUBLICATIONS

German Patent and Trademark Office, Official Action, Serial No. 10 2012 111 103.0, Apr. 1, 2015, 19 pages.
(Continued)

*Primary Examiner* — Thomas Tarcza
*Assistant Examiner* — Tyler J Lee
(74) *Attorney, Agent, or Firm* — Quarles & Brady LLP

(57) ABSTRACT

The present invention provides a steering communication system being able to individually obtain a telemetry data from a steered-object communication devices mounted on the steered-object. An arbitrary identification number assigned to a plurality of steered-object communication devices mounted on a steered-object at the time of pairing-setup is associated with the equipment ID of a pairing object. When performing transmission request of a telemetry data, a steering signal adding the transmission request information and the own identification number is transmitted. The steered-object communication device judges signal classification of the inputted control signal. When the steering signal adding transmission request information and the own identification number is inputted, the steered-object communication device transmits a telemetry data signal adding the telemetry data as an answer signal to a steering communication device.

3 Claims, 9 Drawing Sheets

(51) Int. Cl.
*H04W 56/00* (2009.01)
*H04L 29/06* (2006.01)
*G07C 5/00* (2006.01)

(56) References Cited

U.S. PATENT DOCUMENTS

| | | | |
|---|---|---|---|
| 6,694,228 B2* | 2/2004 | Rios | 701/2 |
| 7,323,970 B1* | 1/2008 | Murray et al. | 340/426.12 |
| 7,469,183 B2* | 12/2008 | Bodin et al. | 701/23 |
| 7,639,115 B2* | 12/2009 | Valoteau et al. | 340/3.71 |
| 7,683,754 B2* | 3/2010 | Autret | 340/3.1 |
| 7,739,002 B2* | 6/2010 | Shen et al. | 701/2 |
| 8,432,950 B2* | 4/2013 | Tanaka et al. | 375/133 |
| 2006/0271251 A1* | 11/2006 | Hopkins | 701/23 |
| 2007/0008916 A1* | 1/2007 | Haugli et al. | 370/320 |
| 2007/0244608 A1* | 10/2007 | Rath et al. | 701/3 |
| 2008/0071429 A1* | 3/2008 | Kraimer et al. | 701/2 |
| 2008/0103649 A1* | 5/2008 | Shen et al. | 701/23 |
| 2008/0129445 A1* | 6/2008 | Kraimer et al. | 340/5.2 |
| 2009/0005167 A1* | 1/2009 | Arrasvuori et al. | 463/40 |
| 2011/0077802 A1* | 3/2011 | Halloran et al. | 701/2 |
| 2011/0304397 A1 | 12/2011 | Stanley | |
| 2011/0304400 A1 | 12/2011 | Stanley | |
| 2012/0022719 A1* | 1/2012 | Matos | 701/2 |

OTHER PUBLICATIONS

Graupner, Computer-System mx-20 HoTT Manual, Aug. 2011, 6 pages.
Weatronic GmbH, Binding—Quickbinding, Manufacturer Guidance, Mar. 17, 2014, 6 pages.

* cited by examiner

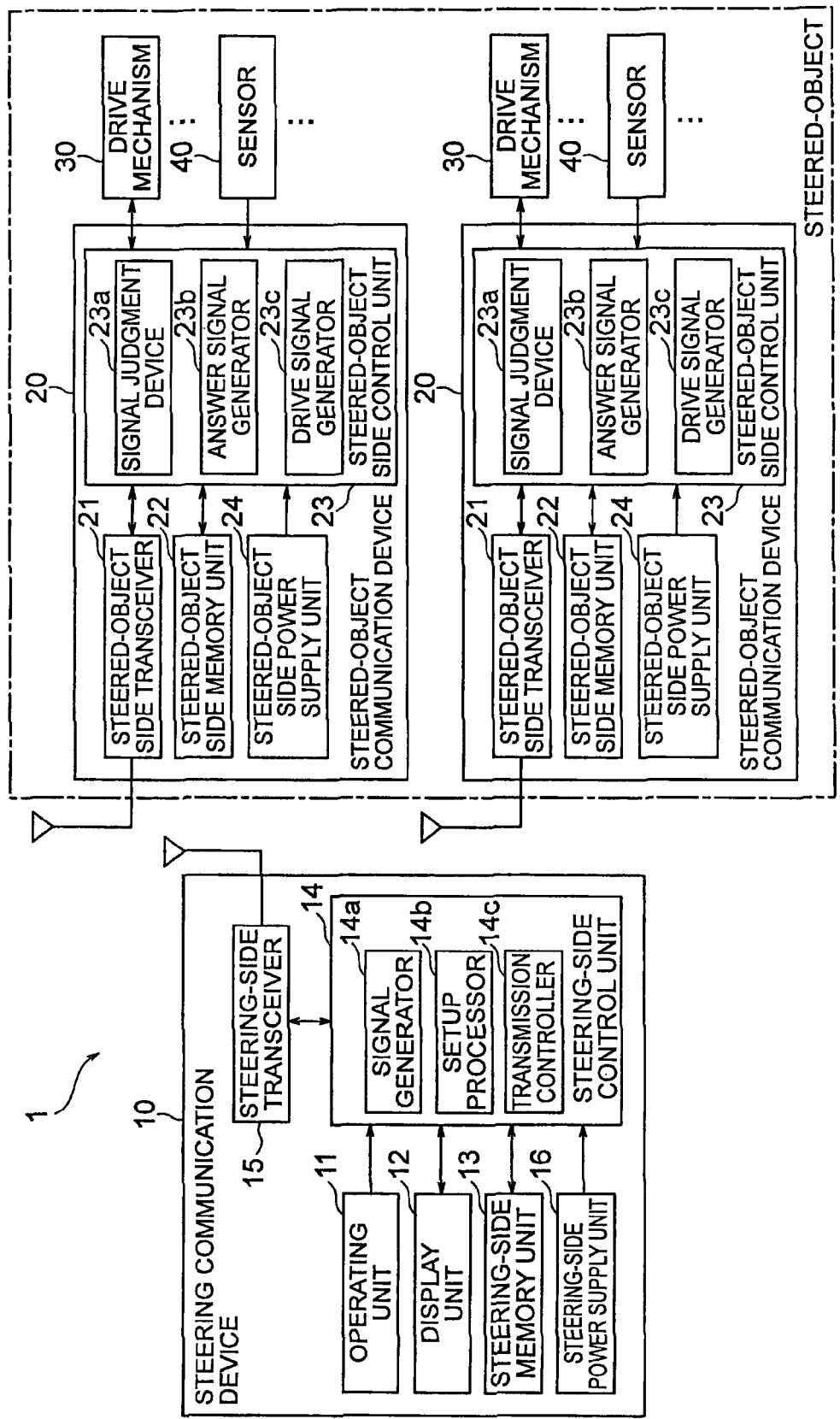

FIG. 2A

| Preamble | SYNC | TX ID | RX No | TRANSMISSION REQUEST FLAG | STEERING DATA | CRC |

FIG. 2B

| Preamble | SYNC | TX ID | RX No | EMPTY | CRC |

FIG. 2C

| Preamble | SYNC | RX ID | RX No | TELEMETRY DATA | CRC |

FIG. 2D

| Preamble | SYNC | TX ID | RX No | RX ID | CRC |

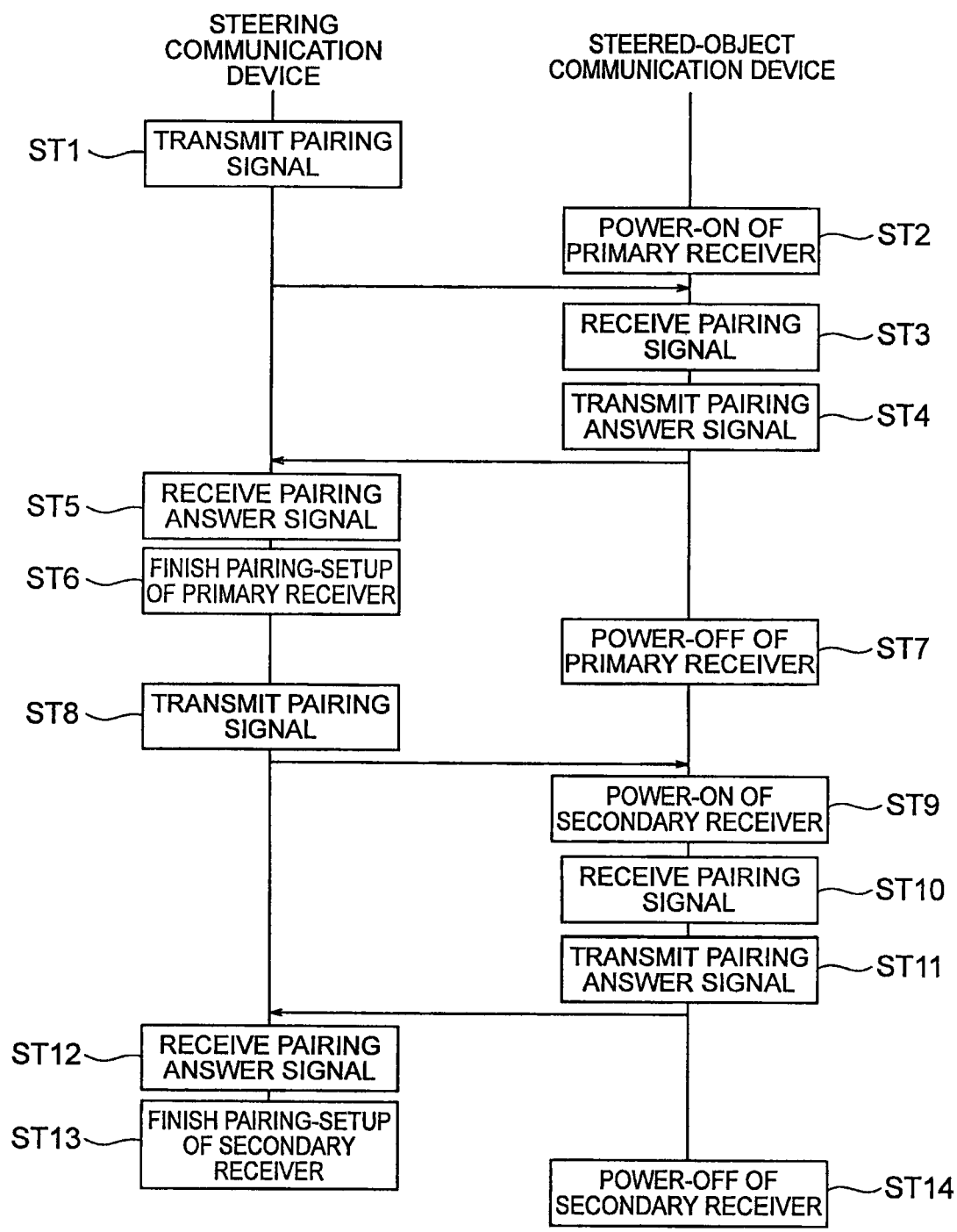

STEERING COMMUNICATION DEVICE, STEERED-OBJECT COMMUNICATION DEVICE AND STEERING COMMUNICATION SYSTEM

BACKGROUND OF THE INVENTION

1. Technical Field

The present invention relates to a steering communication system used in a radio control steered-object such as various models, for example, a model helicopter, plane, car, and ship, and an industrial machine unmanned operated, in particular, the steering communication system communicating between a steering communication device steered by an operator and a plurality of steered-object communication device mounted on an steered-object. More specifically, the present invention relates to a steering communication device, a steered-object communication device and a steering communication system, which are able to obtain a telemetry data of various sensors mounted on the steered-object by request to send the telemetry data for each steered-object communication device.

2. Background of the Invention

In a model plane as a steered object radio-operated, a drive mechanism such as a servomotor or gyroscopic apparatus controlling a ladder, elevator, engine throttle, aileron and the like so as to steer the steered object is mounted. When an operator controls an operating stick at a transmitter end, a steering signal including steering data corresponding to the controlled amount is transmitted to the steered-object. When a receiver mounted on the steered-object receives the steering data, each drive mechanism is properly driven with the required amount, and the steered-object is steered according to the operation of the transmitter side from the operator.

Also, in a big or luxury model plane, the airframe price of the plane is very expensive. As a result, a dual receiving system mounting each one receiver in both wings is used in case of emergencies, such as a case that radio communication from the transmitter is interrupted and thereby the operator is not able to control. By using the above system, even if one receiver is not able to receive the signal normally, the other receiver is able to control, and thereby it is possible to maintain attitude control of the airframe and recover it. As an apparatus using for the above type of system, for example, the invention disclosed in PTL 1 is known.

Furthermore, in another embodiment different from the above dual receiving system, a system using for a diversity function is disclosed in PTL 2. The system has two receivers, and select and use a signal of one of the receivers received normally.

[PTL 1] Japanese Patent Publication No. H02-311100
[PTL 2] Japanese Patent Publication No. 2012-5121

SUMMARY OF THE INVENTION

Technical Problem

There are requests from an operator to mount various sensors, such as a battery voltage sensor, motor revolution-detection sensor, GPS (Global Positioning System) sensor, pressure sensor, altitude sensor, temperature sensor, and so on, in the steered-object so as to understand condition of the airframe and drive environment, and a telemetry function receiving sensor information as telemetry data obtained from a measuring object with each sensor and checking while the plane is flying.

However, currently, there is only function of one-way communication system that communicating in only one direction from the transmitter disclosed in PTL 1 or 2 to the receiver. For this reason, two-way communication system that pairs one transmitter with each receiver, and communicates between the transmitter and the receiver can not be constructed.

As a result, there is only a method constructing a transmitting and receiving system having a construction different from a normal steering transmitter so as to obtain the sensor information from each sensor mounted on the steered-object while steering the steered-object. Furthermore, the airframe equipped with a plurality of the receivers such as a luxury or large plane was not able to mount the telemetry function.

Furthermore, even if the steering communication system is constructed with one steering communication device which allows two-way communication and a plurality of steered-object communication devices which allow two-way communication similar to the steering communication device instead of the transmitter and the plurality of the receivers, the telemetry data is transmitted at the same instant from all steered-object communication devices which allow communication connection according to request to send the telemetry data from the steering communication device. For this reason, accurate telemetry data has not been transmitted by communication jamming between devices each other.

Accordingly, an object of the present invention is to provide a steering communication device, a steered-object communication device, and a steering communication system to enable the telemetry data to be individually obtained from each steered-object communication device without jamming of communication when a system consists of one steering communication device and a plurality of steered-object communication devices.

Solution to Problem

In order to attain the above object, the present invention provides a steering communication device steering a steered-object in communication with a plurality of steered-object communication devices mounted on the steered-object, the steering communication device including: a steering-side control unit configured to control to transmit a pairing-setup signal adding an arbitrary identification number assigned to each steered-object communication device mounted on the steered-object to the steered-object communication device of a pairing object, and to transmit a steering signal adding the identification number and transmission request information for performing transmission request of a telemetry data obtained by the steered-object to the steered-object communication device at a transmission timing based on a predetermined transmission timing information.

Furthermore, the present invention further provides a plurality of steered-object communication devices mounted on a steered-object and communicating with a steering communication device for steering the steered-object, the steered-object communication device including: a steered-object side control unit; wherein when a pairing-setup signal for performing pairing-setup is inputted from the steering communication device, the steered-object side control unit controls to transmit a pairing-setup answer signal adding the own equipment ID and the pairing-setup signal to steering communication device, and wherein when a steering signal, to which the own identification number assigned from the paired steering communication device and transmission request information for performing transmission request of a telemetry data obtained by the steered-object are added, is inputted, the steered-object side control unit controls to transmit a telemetry data signal adding the telemetry data to the steering communication device.

Furthermore, the present invention further provides a steering communication system steering a steered-object by communicating between a steering communication device operating a steered-object and a plurality of steered-object communication devices mounted on the steered-object, the steering communication system including: a steering-side control unit arranged in the steering communication device; and a steered-object side control unit arranged in the steered-object communication device, wherein the steering-side control unit controls to transmit a pairing-setup signal adding an arbitrary identification number assigned to each steered-object communication device mounted on the steered-object to the steered-object communication device of a pairing object, and to transmit a steering signal adding the identification number and transmission request information for performing transmission request of a telemetry data obtained by the steered-object to the steered-object communication device at a transmission timing based on a predetermined transmission timing information, wherein when a pairing-setup signal for performing pairing-setup is inputted from the steering communication device, the steered-object side control unit controls to transmit a pairing-setup answer signal adding the own equipment ID and the pairing-setup signal to steering communication device, and when a steering signal, to which the own identification number assigned from the paired steering communication device and transmission request information for performing transmission request of a telemetry data obtained by the steered-object are added, is inputted, the steered-object side control unit controls to transmit a telemetry data signal adding the telemetry data to the steering communication device.

Advantageous Effects of Invention

According to the present invention, transmission request of the telemetry data can be individually performed for the steered-object communication device mounted on the steered-object, and thereby the telemetry data can be obtained from a specific steered-object communication device without jamming of communication each other.

BRIEF DESCRIPTION OF THE DRAWINGS

FIG. 1 is a function block diagram of each element constituting a steering communication system according to the present invention;

FIGS. 2A and 2B are exemplary diagrams showing packet formats of control signal communicating between the same systems;

FIGS. 2C and 2D are exemplary diagrams showing packet formats of answer signal communicating between the same systems;

FIG. 3 is a process flowchart when pairing-setup is performed in the same systems;

DESCRIPTION OF THE PREFERRED EMBODIMENT

Figure 4A:
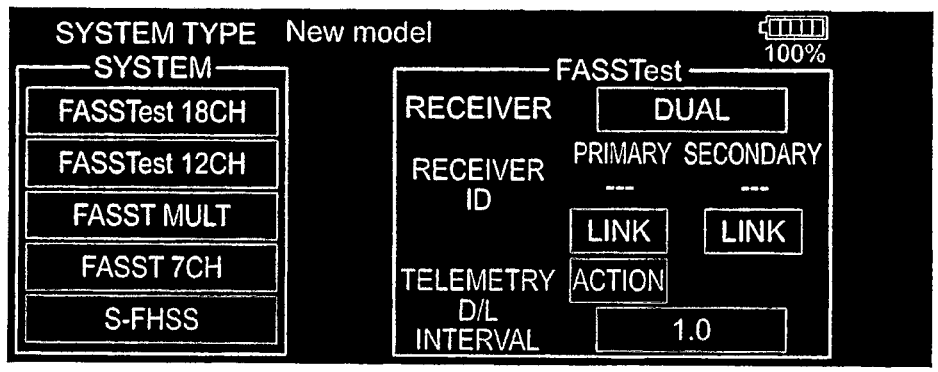
FIGS. 4A, 4B and 4C are exemplary diagrams showing display images when pairing-setup is performed.

An embodiment of the present invention will be explained with reference to drawings. While, an embodiment of the present invention is described, it will be understood that various change and modifications can be made without departing the scope of the present invention.

A steering communication system 1 of the embodiment has a steering communication device 10 communicating with various types control signals so as to steer a steered-object, such as a helicopter, airplane, car, ship, robot and the like, as a main function, as a main function, and a plurality of steered-object communication devices 20 (two steered-object communication devices are shown in FIG. 1) mounted on the steered-object and communicating with various types control signals so as to control operating range of a drive mechanism 30, such as a servo device or gyroscopic apparatus, arranged in a movable part as a main function.

Also, in addition to steering control of the steered-object, an object of the present invention is to achieve a telemetry function pairing each steered-object communication device 20 with one steering communication device 10, and receiving sensor information (hereafter, "telemetry data") obtained by a sensor 40 individually requested to send from the steering communication device 10 to each steered-object communication device 20.

[Device Configuration]

First, system configuration of the steering communication system 1 according to the present invention will be explained with reference to FIGS. 1-9.

<Steering Communication Device>

As shown in FIG. 1, the steering communication device 10 establishes the steering communication system 1, produces various signals required for steering the steered-object, and performs communication process between each steered-object communication device 20 by predefined operation of an operator. Furthermore, the steering communication device 10 has an operating unit 11, a display unit 12, a steering-side memory unit 13, a steering-side control unit 14, a steering-side transceiver 15, and a steering-side power supply unit 16.

The operating unit 11 is composed of various operational tools, for example a lever such as a stick-lever, a switch, a touch panel arranged on a display screen of the display unit 12, and an edit key. Furthermore, the operating unit 11 outputs an analog signal as an operation signal according to operating information based on a touch position of the touch panel to the steering-side control unit 14.

The display unit 12 is composed of a display device such as a liquid crystal display. The display unit 12 displays data about pairing-setup, a telemetry data obtained by the sensor 40 mounted on the steered-object received from the steered-object communication device 20, and information required for constructing the steering communication system 1 by the operator and for steering the steered-object.

The steering-side memory unit 13 is composed of memory medium, for example a semiconductor memory such as ROM or RAM and HDD, and stores drive control information of each unit provided in the steering communication device 10. Furthermore, the steering-side memory unit 13 stores information in a state mapping the equipment ID of the steered-object communication device 20 being a pairing object when pairing-setup is performed to an identification number arbitrarily-assigned to the steered-object communication device 20, and stores transmission timing information indicating transmission timing of a steering signal so as to request to send telemetry data for the steered-object communication device 20.

Also, the transmission timing information is data defining the transmission timing of the steering signal adding transmission request information transmitted according to the transmission timing of the steering signal. Furthermore, the operator is able to set arbitrary transmission timing based on the number of the sensor 40 connected to the steered-object communication device 20 being destination, type of the telemetry data requested and sent, importance of the telemetry data, environment of usage, drive condition and so on.

Furthermore, in next transmission timing after transmitting the steering signal adding transmission request information from the steering communication device 10, since the steering communication device 10 receives the telemetry data signal from the steered-object communication device 20 being a transmission request object, the steering communication device 10 is not able to transmit the steering signal. For this reason, it is required to determine the transmission timing information by considering operation-response and performance trade-off of the telemetry data. In addition, by setting the transmission timing for each steered-object communication device, when accurate telemetry data is required, or multiple sensors are connected, it is possible to reduce the transmission timing of the transmission request. Furthermore, when the sensor is not connected, or the telemetry data may be obtained at broad intervals, it is possible to extend the transmission timing of the transmission request, or to not request to send.

The steering-side control unit 14 is composed of CPU and a microcomputer such as ROM and RAM, and controls each unit included in the steering communication device 10 based on the steering signal from the operating unit 11. For example, the steering-side control unit 14 controls generation of various control signals for steering the steered-object, communication between the steered-object communication devices 20, process accruing to answer signal received from the steered-object communication device 20, and display of various display contents required for operating a system.

Furthermore, the steering-side control unit 14 has a signal generator 14a generating control signal, such as the steering or pairing-setting signal, outputted to the steered-object communication device 20 via steering-side transceiver 15, a setting processor 14b pairing-setting the steered-object communication device 20 and setting transmission request timing of the telemetry data for the steered-object communication device 20, and a transmitting controller 14c controlling the transmission timing of the steering signal adding the transmission request information of the telemetry data.

The signal generator 14a is composed of common signal-forming circuit, and generates various types of control signals for the steered-object communication device 20. For example, the signal generator 14a produces pairing-setup signal for individually performing pairing-setup between the steered-object communication devices 20, steering signal such as PWM signal for driving the drive mechanism 30 mounted on the steered-object, and steering signal adding the transmission request information of the telemetry data for the steered-object communication device 20 to the steering signal. Furthermore, the signal generator 14 outputs each produced control signal into the steering-side transceiver 15.

Here, a packet format of control signal (a steering signal and pairing-setup signal) generated by the signal generator 14a will be explained with reference to FIG. 2.
(Steering Signal)

As shown in FIG. 2, a packet format of the steering signal consists of a preamble field indicating a phase synchronization code, a SYNC field indicating a data synchronization code, a TX ID field indicating the equipment ID of the steering communication device 10 (TX), a RX number (RX No) field indicating the identification number assigned to the steered-object communication device 20 (RX) when pairing-setup is performed, a transmission request flag field indicating the presence or absence of the transmission request information, a steering data field indicating steering data, and a CRC code field checking data errors.

When the transmission request of the telemetry data is performed against the steered-object communication device 20, the steering signal adding the transmission request information to the transmission request flag field of the steering signal is generated. As one example, when the transmission request flag field is "0", the steering signal to which the transmission request information is not added is generated. On the other hand, when the transmission request flag field is "1", the steering signal to which the transmission request information is added is generated.
(Pairing-Setup Signal)

As shown in FIG. 2B, a packet format of the pairing-setup signal consists of a preamble field indicating a phase synchronization code, a SYNC field indicating a data synchronization code, a TX ID field indicating the equipment ID of the steering communication device 10 (TX), a RX number field indicating the identification number assigned to the steered-object communication device 20 (RX) when pairing-setup is performed, a RX ID field of empty state, and a CRC code field checking data errors. In the RX ID filed, the equipment ID of the steered-object communication device 20 being a pairing object is added.

When the steered-object communication device 20 being the pairing-setup object is selected at the time of pairing-setup, the identification number assigned to the steered-object communication device 20 is added to the pairing-setup signal, and the RX ID field is generated with a empty state. Furthermore, the pairing-setup signal is transmitted within a predetermined time after starting the pairing-setup by the steering communication device 10, and the steering signal is not transmitted during that time.

The setup processor 14b performs processing of the pairing-setup executed between the steered-object communication devices 20 based on a predefined operation from the operating unit 11, various setups required for operating the steering communication system 1, and a change according to the setup. More specifically, the setup processor 14b registers the equipment ID, and switches display contents according to operation procedure.

Here, a paring-setup process for pairing the steering communication device 10 with the steered-object communication device 20 will be explained with reference to FIGS. 3 to 7. The following description discusses a process when one steering communication device 10 and two steered-object communication devices 20 are provided. In drawings, one steered-object communication device 20 is shown as "primary receive", and the other steered-object communication device 20 is shown as "secondary receiver".

Figure 4B:
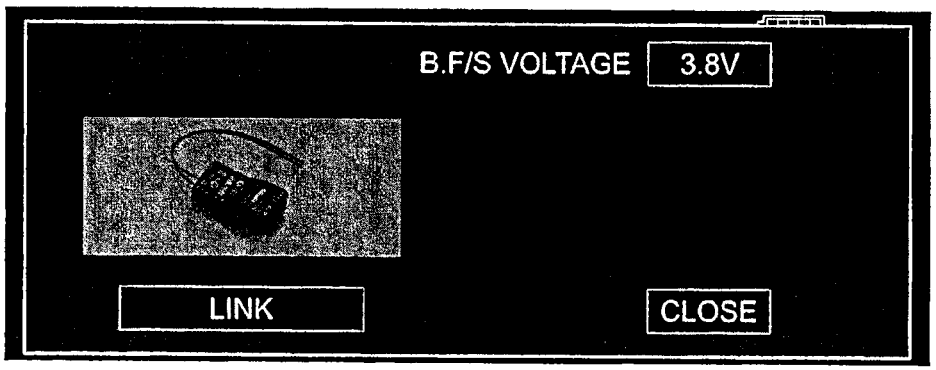

First, a pairing-setup processing of the primary receiver will be explained. As shown in FIG. 3, the operator operates the steering communication device 10 with a predefined action, and displays a pairing-setup screen. Thereafter, the operator operates the operating unit 11 with reference to the display contents to select the pairing-setup object and transmit the pairing-setup signal (ST1). As the display contents in ST1, the pairing-setup screen is displayed on the display unit 12 as shown in FIG. 4A. When the operator pushes a "link" button corresponding to the primary receiver being a configuration object, a reconfirmation screen of the link is displayed as shown in FIG. 4B. Thereafter, when the "link" button on the display screen is pushed, the pairing-setup signal is transmitted from the steering communication device 10 in a predetermined time.

Figure 4C:
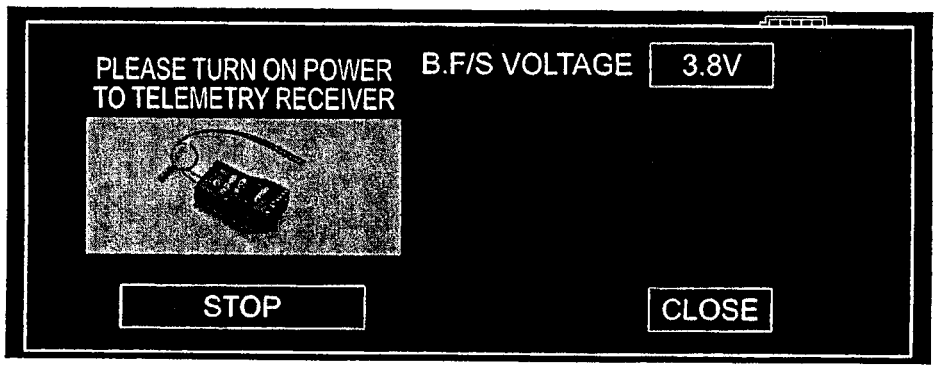

Next, a power of the steered-object communication device 20 of the configuration object is ON (ST2). As the display contents in ST2, an indication screen promoting power-on of the primary receiver of the pairing-setup object is displayed on the display unit 12 as shown in FIG. 4C. As a result, the operator turn on power to the primary receiver according to this displayed screen.

Figure 5A:
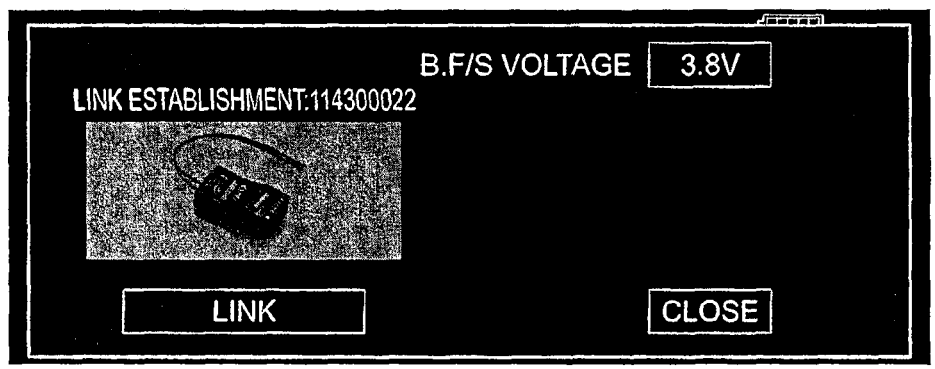
FIGS. 5A, 5B and 5C are exemplary diagrams showing display images when paring-setup is performed.
Figure 5B:
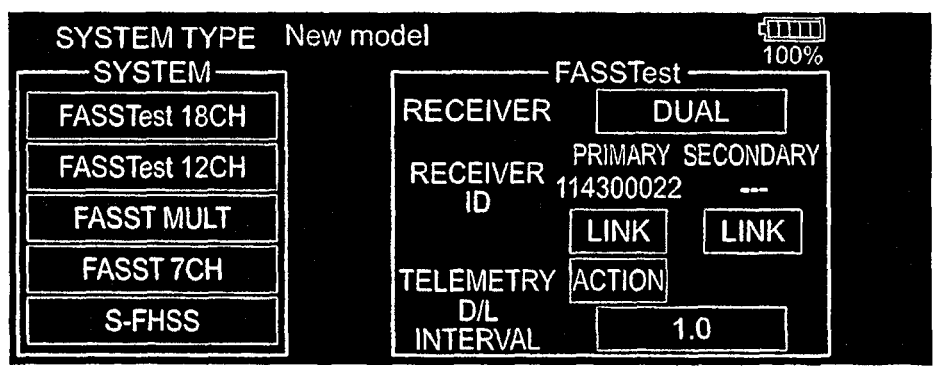

Next, the primary receiver powered ON by the operator receives the pairing-setup signal transmitted from the steering communication device 10 (ST3), and transmits the pairing-setup answer signal as an answer signal for the pairing-setup signal (ST4). The steering communication device 10 receives the pairing-setup answer signal from the primary receiver (ST5), and terminates the pairing-setup processing after registering the equipment ID of the primary receiver on the steering-side memory unit 13 (ST6). As the display contents in ST 4 and ST 5, after registration processing of the pairing-setup answer signal from the primary receiver is completed, the equipment ID "11430022" of the primary receiver is displayed on the display unit 12 as shown in FIG. 5A. Thus, the completion of the pairing-setup between the steering communication device 10 and the primary receiver is indicated on the display unit 12. Furthermore, as shown in FIG. 5B, the equipment ID of the primary receiver is displayed in an ID column displayed on the pairing-setup screen of the display unit 12.

Also, after the operator confirms the display contents in ST6, the operator decides that the primary receiver normally finishes the pairing-setup, and then turns OFF power to the primary receiver (ST7).

Figure 5C:
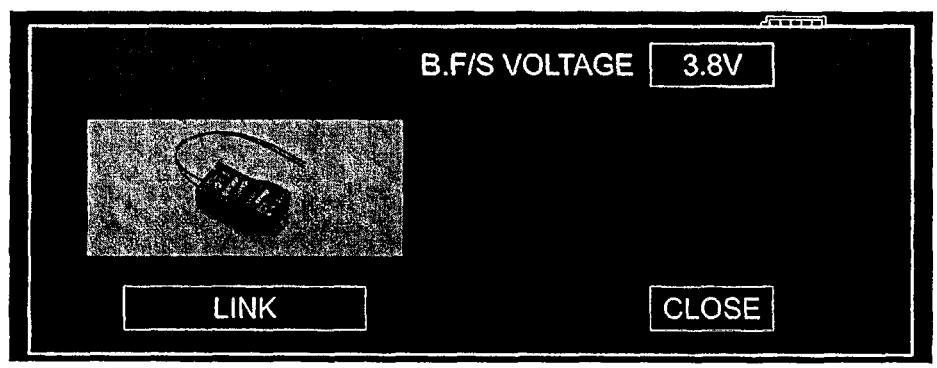

Next, a pairing-setup processing of the secondary receiver will be explained. As shown in FIG. 3, following the configuration of the primary receiver, the pairing-setup of the secondary receiver is performed. In common with the pairing-setup processing of the primary receiver, the pairing-setup of the secondary receiver is performed as below. First, the operator displays a pairing-setup screen, and operates the operating unit 11 with reference to the display contents so as to select the pairing-setup object and transmit the pairing-setup signal (ST8). As the display contents in ST8, the pairing-setup screen is displayed on the display unit 12 as shown in FIG. 5B. When the operator pushes a "link" button corresponding to the secondary receiver being a configuration object, a reconfirmation screen of the link is displayed as shown in FIG. 5C. Thereafter, when the "link" button on the display screen is pushed, the pairing-setup signal is transmitted from the steering communication device 10 in a predetermined time.

Figure 6A:
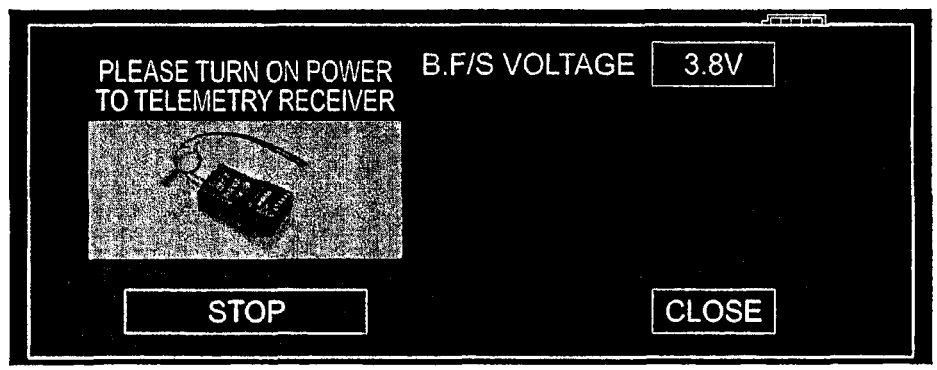
FIGS. 6A, 6B and 6C are exemplary diagrams showing display images when paring-setup is performed.

Next, power of the steered-object communication device 20 of the configuration object is ON (ST9). As the display contents in ST9, an indication screen promoting power-on of the secondary receiver of the pairing-setup object is displayed on the display unit 12 as shown in FIG. 6A. As a result, the operator turns ON power to the secondary receiver according to this displayed screen.

Next, the secondary receiver powered ON by the operator receives the pairing-setup signal transmitted from the steering communication device 10 (ST10), and transmits the pairing-setup answer signal as an answer signal against the pairing-setup signal (ST11).

Figure 6B:
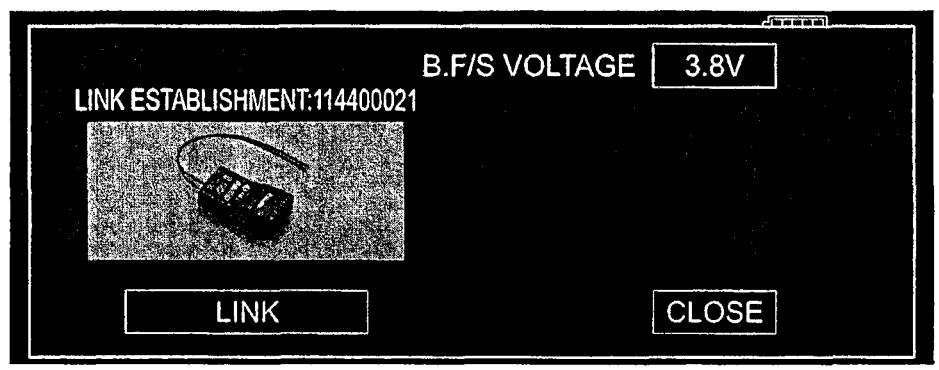

The steering communication device 10 receives the pairing-setup answer signal from the secondary receiver (ST12), and terminates the pairing-setup processing after registering the equipment ID of the secondary receiver on the steering-side memory unit 13 (ST13). As the display contents in ST 11 and ST 12, after registration processing of the pairing-setup answer signal from the secondary receiver is completed, the equipment ID "11440021" of the secondary receiver is displayed on the display unit 12 as shown in FIG. 6B. Thus, the completion of the pairing-setup between the steering communication device 10 and the secondary receiver is indicated.

Figure 6C:
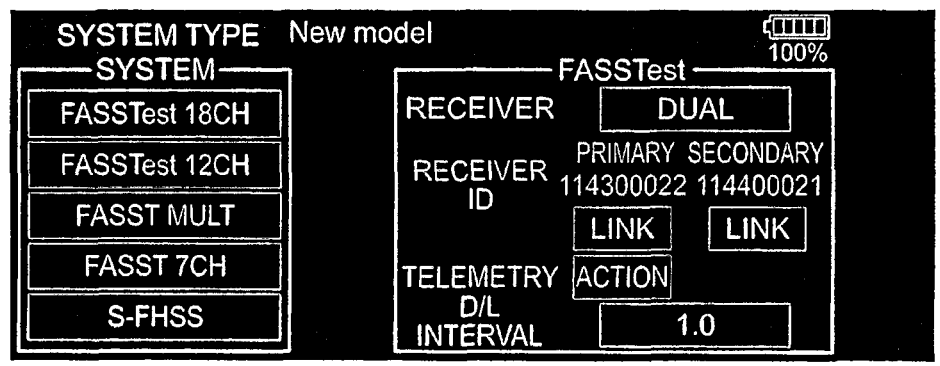

Furthermore, as shown in FIG. 6C, the equipment ID of the secondary receiver is displayed in an ID column displayed on the pairing-setup screen of the display unit 12.

Figure 7:
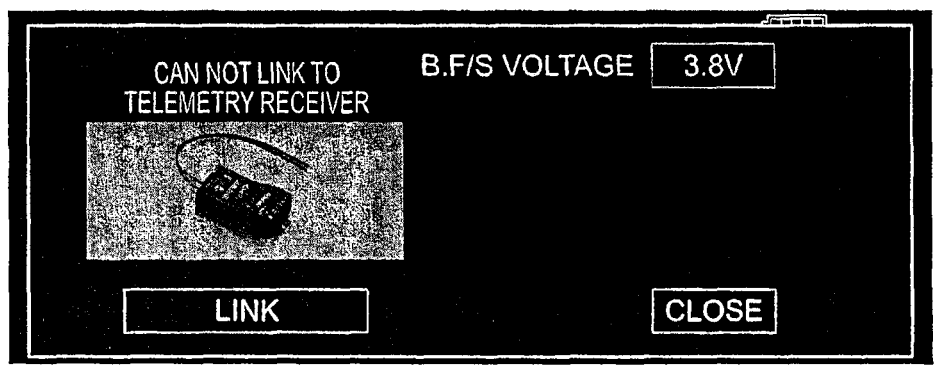
FIG. 7 is an exemplary diagram showing a display image when paring-setup is performed.

Also, after the operator confirms the display contents in ST13, the operator decides that the secondary receiver normally finishes the pairing-setup, and then turns OFF power to the secondary receiver (ST14). Furthermore, when the pairing-setup is not performed within a predetermined time or with communication failure, a content indicating occurrence of the error during pairing-setup is displayed on the display unit 12 as shown in FIG. 7.

The transmission controller 14c controls the transmission of the steering signal adding the transmission request information of the telemetry data generated by the signal generator 14a based on the transmission timing information stored in the steering-side memory unit 13 in the case of normal steering mode after finishing the pairing-setup.

Figure 8:
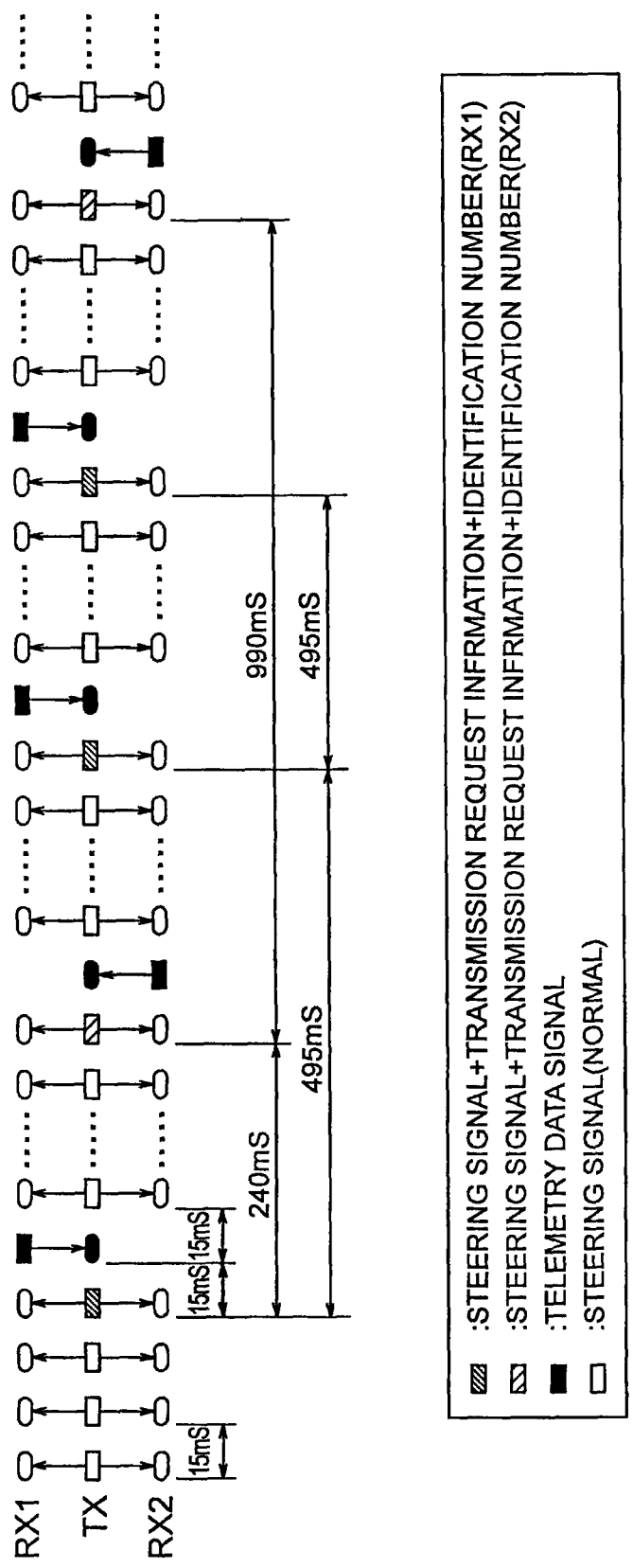
FIG. 8 is an exemplary diagram showing one example of transmission timings of the control signal and the answer signal.

FIG. 8 is a diagram showing one example of communication timing between the steering signal to which the transmission request information from the steering communication device 10 is added and the telemetry data signal from the steered-object communication device 20. As shown in FIG. 8, the transmission timing between the steering communication device 10 (TX) and the steered-object communication device 20 is fixed 15 ms. Also, the transmission timing from the point when transmitting the steering signal adding the transmission request information into the steered-object communication device 20 (RX1) to the point when again transmitting the steering signal thereto is 495 ms. Furthermore, the transmission timing from the point when transmitting the steering signal adding the transmission request information into the steered-object communication device 20 (RX2) to the point when again transmitting the steering signal thereto is 990 ms. That is, the transmission timing (990 ms) of the steered-object communication device (RX2) is twice the length of the transmitting timing (495 ms) of the steered-object communication device (RX1).

The steering-side transceiver 15 is composed of well-known transmitting-receiving equipments. The steering-side transceiver 15 modulates control signal from the signal generator 14a into high-frequency wave such as an AM (Amplitude Modulation) and FM (Frequency Modulation), or with spectrum spread system based on control of the steering-side control unit 14, and then transmits the modulated signal to the steered-object communication device 20 from an antenna through radio waves. Thereafter, the steering-side transceiver 15 receives the signal from the steering communication device 10 from the antenna through radio waves, amplifies the received signal, demodulates the received signal into answer signal such as telemetry data signal or pairing-setup answer signal, and outputs the answer signal to the steering-side control unit 14.

The steering-side power supply unit 16 is composed of a well-known power circuit including a power ON/OFF switch and a power supply device, and supplies drive power to each unit provided in the steering communication device 10 based on control of the steering-side control unit 14.

<Steered-Object Communication Device>

As shown in FIG. 1, the steered-object communication device 20 is mounted on a steered-object, communicates with various signals between the steering communication devices 10 paired by the pairing-setup, outputs drive signal to the drive mechanism 30 connected thereto, and obtains the telemetry data from the sensor 40. The steered-object communication device 20 has a steered-object side transceiver 21, a steered-object side memory unit 22, a steered-object side control unit 23, and a steered-object side power supply 24.

The steered-object side transceiver 21 is well-known transmitting-receiving equipments. The steered-object side transceiver 21 amplifies the signal from the steering communication device 10 from the antenna through radio waves, demodulates the received signal into control signal, and outputs the control signal to the steered-object side control unit 23 based on control of the steered-object side control 23. Furthermore, based on control of the steered-object side control 23, the steered-object side transceiver 21 modulates answer signal such as the telemetry data signal or pairing-setup answer signal into high-frequency wave such as an AM (Amplitude Modulation) and FM (Frequency Modulation), or with spectrum spread system, and then transmits the answer signal to the steered-object communication device 20 from the antenna through radio waves.

The steered-object side memory unit 22 is composed of memory medium, for example a semiconductor memory such as a ROM or RAM and HDD, and stores the telemetry data obtained by each sensor 40 mounted on the steered-object, the identification number assigned when pairing-setup is performed, and drive control information of each unit provided in the steered-object communication device 20.

The steered-object side control unit 23 is composed of CPU and a microcomputer such as ROM and RAM, and controls drive of each unit included in the steered-object communication device 20. For example, the steered-object side control unit 23 controls classification decision of the control signal from the steered-object side transceiver 21, generation and transmission of the answer signal such as the telemetry data signal or the pairing-setup answer signal for the control signal, acquisition of the telemetry data obtained by the sensor 40, and output of the drive signal for the drive mechanism. Also, the drive control of each unit constructing the steered-object side control unit 23 moves in synchronization with a clock signal from an oscillation circuit (not shown) composed of a crystal oscillator and a divider circuit.

Also, the steered-object side control unit 23 has a signal judgment device 23a decides the control signal, such as the steering signal, the steering signal to which the transmission request information is added, and the pairing-setup signal, from the steering communication device 10 via the steered-object side transceiver 21, an answer signal generator 23b generating the answer signal such as the pairing-setup answer signal or telemetry data signal against the steering communication device 10, and a drive generator 23c generating the drive signal against the drive mechanism 30 from the steering signal from the steering communication device 10.

The signal judgment device 23a judges the control signal inputted through the steered-object side transceiver 21, and performs processing according to classification of the signal. More specifically, the signal judgment device 23a judges whether the control signal is pairing-setup signal or steering signal. When the control signal is the steering signal, the signal judgment device 23a judges whether the transmission request information and the own identification number are added or not, and then performs processing according to each judgment result.

Here, the judgment of signal classification performed by the signal judgment device 23a and processing contents according to each judgment result will be explained with reference to FIG. 9. First, the signal judgment device 23a judges whether the inputted control signal is the steering signal or not (ST21).

At this time, when the control signal is steering signal (when ST21 is Yes), the signal judgment device 23a judges whether the transmission request information and the own identification number are added to the steering signal or not (ST22). On the other hand, when the control signal is not steering signal (when ST21 is NO), the control signal is the pairing-setup signal. As a result, the signal judgment device 23a outputs a pairing-setup answer signal generating instruction to the answer signal generator 23b (ST23) so as to generate the answer signal for the pairing-setup signal. Thereafter, the signal judgment processing is finished.

In ST22, when the transmission request information and the own identification number are added to the steering signal (when ST22 is Yes), the telemetry data signal generating instruction for generating the telemetry data signal including the telemetry data is outputted to the answer signal generator 23b so as to response to the steering communication device 10. Furthermore, the steering data added to the steering signal is outputted to the drive signal generator 23c (ST24), and then the signal judgment processing is finished. On the other hand, when the transmission request information and the own identification number are not added to the steering signal (when ST22 is No), the inputted steering signal is processed as a normal steering signal. Thus, the steering data added to the steering signal is outputted to the drive signal generator 23c (ST25), and then the signal judgment processing is finished.

In order to response to the steering signal to which the transmission request information from the steering communication device 10 is added, the answer signal generator 23b generates a telemetry data by the telemetry data signal generating instruction from the signal judgment device 23a, and outputs the telemetry data to the steered-object side transceiver 21. Furthermore, the answer signal generator 23b generates a pairing-setup answer signal, which is the answer signal for the pairing-setup signal transmitted at the time of pairing-setup, by the pairing-setup answer signal generating instruction from the signal judgment device 23a, and outputs the pairing-setup answer signal to the steered-object side transceiver 21.

Here, the answer signal (namely, the telemetry data signal and the pairing-setup answer signal) generated with the answer signal generator will be explained with reference to FIG. 2.

(Telemetry Data Signal)

As shown in FIG. 2C, a packet format of the telemetry data signal consists of a preamble field indicating a phase synchronization code, a SYNC field indicating a data synchronization code, a RX ID field indicating the equipment ID of the steered-object communication device 20, a RX No field indicating the identification number assigned to the steered-object communication device 20 (RX) at the time of pairing-setup, a telemetry data field indicating the telemetry data, and a CRC code field checking data errors. That is, the telemetry data signal is the answer signal converting the transmission request flag field and the steering data field in the steering signal, to which the transmission request information inputted from the steering communication device 10 is added, to the telemetry data field.

(Pairing-Setup Answer Signal)

As shown in FIG. 2D, a packet format of the pairing-setup answer signal consists of a preamble field indicating a phase synchronization code, a SYNC field indicating a data synchronization code, a TX ID field indicating the equipment ID of the steering communication device 10 (TX), a RX number field indicating the identification number assigned to the steered-object communication device 20 (RX) at the time of pairing-setup, a RX ID field adding the equipment ID of the steered-object communication device 20 being a pairing object, and a CRC code field checking data errors. That is, the pairing-setup answer signal is answer signal adding the own equipment ID to the empty RX ID field in the inputted pairing-setup signal.

The drive signal generator 23c detects a pulse width of the steering data from the signal judgment device 23a, generates a signal so that difference data (deviation) between the pulse width (desired value) depending on the steering data and the pulse width (actual measured value) is the drive signal (PWM signal) of the selected drive frequency, and outputs the drive signal to the drive mechanism 30 being an output object.

The steered-object side power supply 24 is composed of a well-known power circuit including a power ON/OFF switch and a power supply device, and supplies drive power to each unit provided in the steered-object communication device 20 based on control of the steered-object control unit 23.

<Drive Mechanism>

The drive mechanism 30 is an apparatus for independently driving and controlling moving components such as a ladder, aileron, elevator, and engine-throttle in the steered-object. Furthermore, the drive mechanism 30 is a power transmission mechanism for driving a motor by applying electrical current in a normal direction or opposite direction according to the drive signal supplied from the steered-object control unit 23, and moving the moving components based on the rotation of an output axis connected through a deceleration device. Also, the rotation position of the output axis is detected by a position detector. For example, the position detector may be a detectable device detecting the position of the output axis of a potentiometer, rotary encoder, or resolver. The detected position information is outputted to the drive signal generator 23c.

<Sensor>

The sensor 40 is composed of various types of sensors, for example, a voltage sensor, rotation-number detection sensor, GPS (Global Positioning System) sensor, pressure sensor, temperature sensor, and altitude sensor, and mounted on a position located near a measuring object such as a servo device, gyroscopic apparatus, and battery of the steered-object side power supply unit 24 in the steered-object or a position being able to measure drive environment such as atmospheric pressure, temperature, altitude, and flight position in the steered-object. Furthermore, the sensor 40 outputs the telemetry data measured from the measuring object to the steered-object control unit 23.

[Process Action]

Next, a series of processing action example from pairing-setup to obtain the telemetry data in the above steering communication system 1 will be explained.

First, the operator operates the steering communication device 10 according to display contents of the pairing-setup screen displayed on the display unit 12 so as to pair with the steered-object communication device 20 mounted on the steered-object. As shown in FIG. 3, the pairing-setup signal is generated in the steering communication device 10, and then the pairing-setup signal is transmitted to the steered-object communication device 20 of a pairing object.

Next, the steered-object communication device 20 of the pairing object is powered on. The steered-object communication device 20 judges classification of the inputted control signal as shown in FIG. 9. When the inputted control signal is the pairing-setup signal, the pairing-setup answer signal adding the own equipment ID to the pairing-setup signal inputted as the answer signal is generated, and the pairing-setup answer signal is transmitted to the steering communication device 10. Thereafter, the steering communication device 10 stores information of a state that the identification number which is added to the inputted pairing-setup answer signal is assigned to the equipment ID of the steered-object communication device 20 of the pairing object in the steering-side memory unit 13. Thereby, the pairing-setup between the steering communication device 10 and the steered-object communication device 20 is completed.

After the pairing-setup is completed between the steering communication device 10 and the steered-object communication device 20, the steering of the steered-object is performed with operating the steering communication device 10. When the steering of the steered-object is started, the steering signal adding the transmission request information and the destination identification number is generated, and is transmitted to the steered-object communication device 20 being the destination depending on the transmission timing of the steering signal according to the transmission timing information of the telemetry data for the predetermined steered-object communication device 20.

Figure 9:
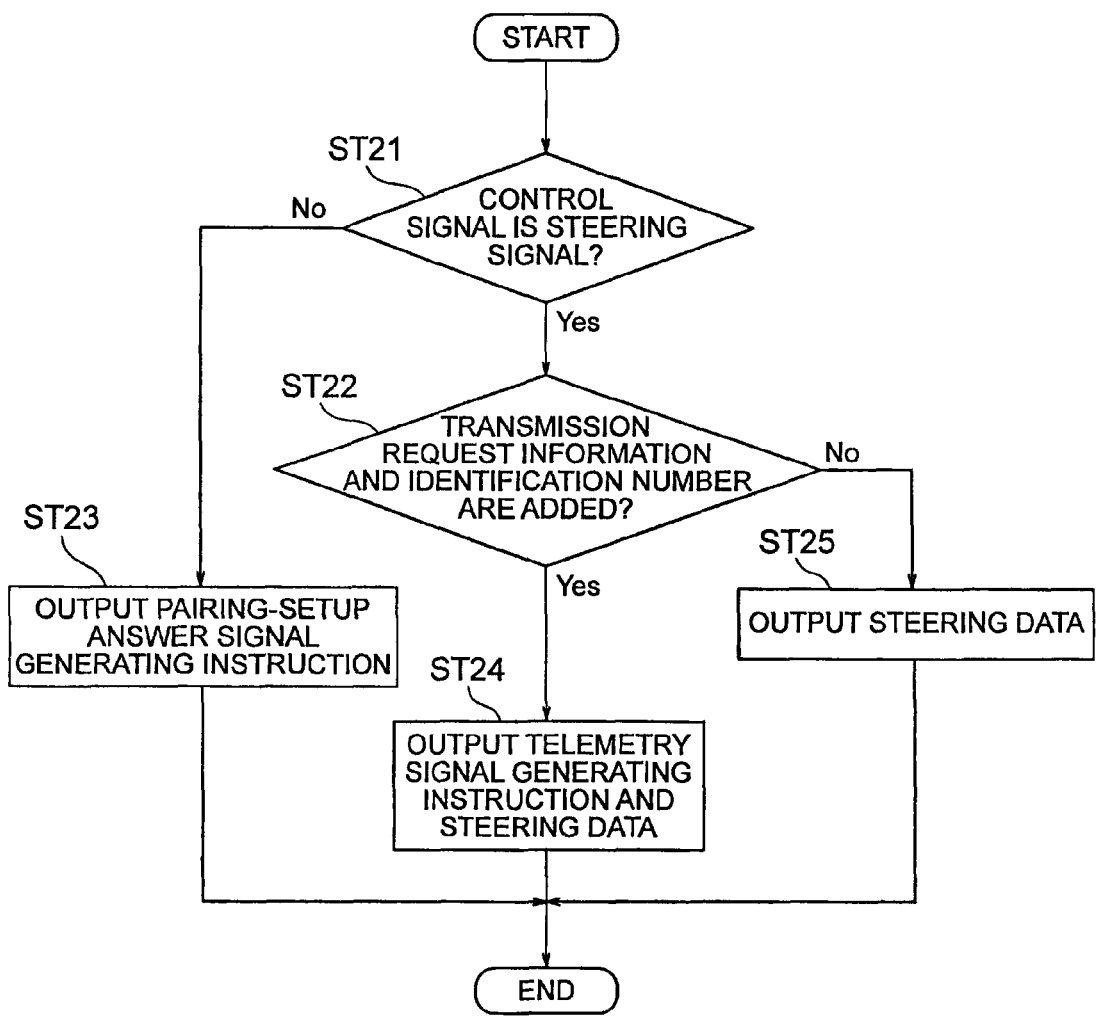
FIG. 9 is a flowchart showing process according to signal status of the control signal inputted to the steered-object communication device and the result thereof.

When the control signal is the steering signal to which the transmission request information and the own identification number are added as shown in FIG. 9, the steered-object communication device 20 generates drive signal of the drive mechanism 30 based on the steering signal, and outputs the drive signal to the drive mechanism 30. Also, the steered-object communication device 20 generates the telemetry data signal being a signal adding the telemetry data previously obtained by the sensor 40 to the steering signal, and transmits the telemetry data to the steering communication device 10.

Thereafter, when the telemetry data signal from the steered-object communication device 20 is inputted, the steering communication device 10 stores the telemetry data added to the steering signal in the steering-side memory unit 13, and displays on the display unit 12 as necessary.

As discussed previously, the above steering communication system 1 associates an arbitrary identification number, which is individually-assigned to a plurality of the steered-object communication devices 20 mounted on the steered-object at the time of pairing-setup, with the equipment ID of the pairing object. Furthermore, the steering communication system 1 transmits the steering signal adding the transmission request information and the destination identification number to the steering communication device 10 when performing the transmission request of the telemetry data. The steered-object communication device 20 judges signal classification of the received control signal. When the control signal is a steering signal adding the transmission request information and the own identification number, the steered-object communication device 20 transmits the telemetry data signal adding the telemetry data as a response to the steering communication device 10.

Thereby, transmission request of the telemetry data can be individually performed for the steered-object communication devices 20 mounted on the steered-object. Thus, the steering communication system of interactive communication, which is able to obtain the telemetry data from the specific steered-object communication device 20 without jamming of communication each other, can be constructed. Furthermore, since such system can be provided, the present invention has the advantage that there is no need to construct new system for obtaining the telemetry data. As a result, the telemetry data can be obtained by only performing the transmission request of the telemetry data according to the steering signal.

REFERENCE SIGNS LIST

1 steering communication system
10 steering communication device
11 operating unit
12 display unit
13 steering-side memory unit
14 steering-side control unit
14a signal generator
14b setup processor
14c transmission controller
15 steering-side transceiver
20 steered-object communication device
21 steered-object side transceiver
22 steered-object side memory unit
23 steered-object side control unit
23a signal judgment device
23b answer signal generator
23c drive signal generator
24 steered-object side power supply
30 drive mechanism
40 sensor

What is claimed is:

1. A steering communication device steering a steered-object in communication with a plurality of steered-object communication devices mounted on the steered-object, each of the steered-object communication devices further in communication with a corresponding sensor, and each having an arbitrary identification number respectively assigned to identify the corresponding steered-object communication device, the steering communication device comprising:
    a steering-side control unit configured to transmit a pairing-setup signal along with the identification number assigned to a selected one of the plurality of steered-object communication devices to independently pair the steered-object communication device with the steering-side control unit to selectively transmit a steering signal and a data request signal along with the identification number of the selected steered object communication device to the selected steered-object communication device at a predetermined transmission time after transmitting the pairing-setup signal to steer and obtain data from the sensor corresponding to the selected steered-object communication device at predetermined intervals.

2. A plurality of steered-object communication devices mounted on a steered-object and communicating with a steering communication device for steering the steered-object, the steered-object communication device comprising:
    a steered-object side control unit configured to judge whether a control signal received from the steering communication device is a steering signal or a pairing-setup signal for performing pairing-setup with a selected one of the plurality of steered-object communication devices,
    wherein when the pairing-setup signal is received from the steering communication device, the steered-object side control unit is configured to transmit a pairing-setup answer signal along with an equipment ID of the selected steered-object communication device to the steering communication device,
    wherein the plurality of steered-object communication devices are capable of independently pairing with the steering communication device, and
    wherein when the steering signal is received as the control signal from the steering communication device, the steered-object side control unit is configured to transmit telemetry data from a sensor to the steering communication device.

3. A steering communication system steering a steered-object by communicating between a steering communication device operating a steered-object and a plurality of steered-object communication devices mounted on the steered-object, an arbitrary identification number being respectively assigned to each of the plurality of steered-object communication devices, the steering communication system comprising:
    a steering-side control unit arranged in the steering communication device; and
    a steered-object side control unit arranged in the steered-object communication device and in communication with a corresponding sensor,
    wherein the steering-side control unit is configured to transmit a pairing-setup control signal and an identification number assigned to a selected one of the plurality of steered-object communication devices to independently pair the steered-object communication device with the steering-side control unit to selectively transmit a steering signal and a data request signal at a predetermined transmission time after transmitting the pairing-setup signal to steer and obtain data from the sensor corresponding to the selected steered-object communication device at predetermined intervals, and
    the steered-object side control unit corresponding to the identification number is configured to transmit a pairing-setup answer signal and an identification number, to the steering communication device, and when a steering signal is received from the steering communication device, the steered-object side control unit is configured to transmit telemetry data from the sensor to the steering communication device.

\* \* \* \* \*